June 17, 1969   A. MONOMAKHOFF   3,449,939
APPARATUS FOR EXTRACTION AND QUANTITY
DETERMINATION OF GAS IN AIR Filed May 3, 1966   Sheet 1 of 2

Inventor
Alexandre Monomakhoff
By
Karl W. Flocks
Attorney

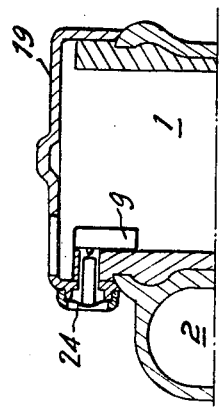
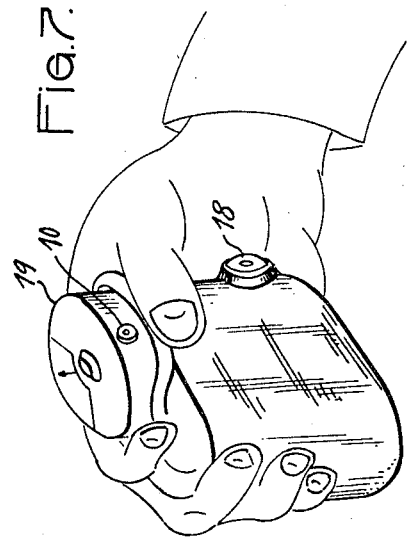
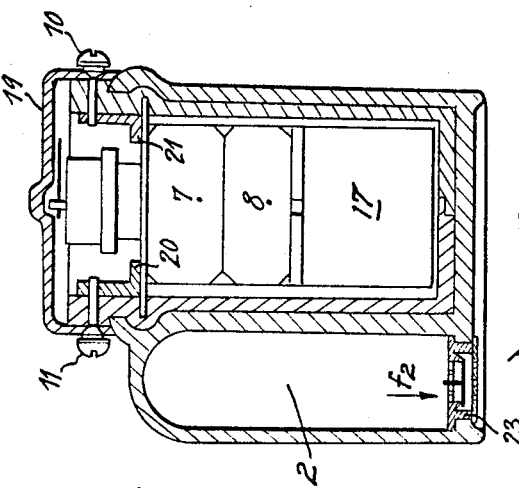
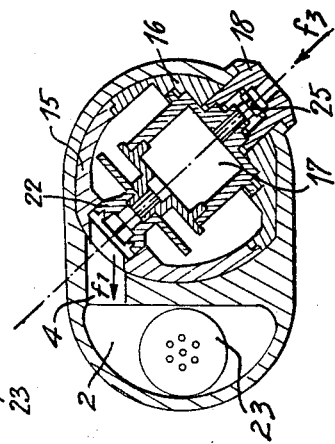

United States Patent Office 3,449,939
Patented June 17, 1969

3,449,939
APPARATUS FOR EXTRACTION AND QUANTITY DETERMINATION OF GAS IN AIR
Alexandre Monomakhoff, Verneuil-en-Halatte, France, assignor to Charbonnages de France, Paris, France, a public institution of France
Filed May 3, 1966, Ser. No. 547,300
Claims priority, application France, May 4, 1965, 15,634
Int. Cl. G01n *31/12*
U.S. Cl. 73—26                                                5 Claims

ABSTRACT OF THE DISCLOSURE

A detector employing an electrically heated filament means, power source and indicating means for sampling and quantity determination of gas in air of a type which is carried and operated in one hand.

---

The present invention has for its object a new portable instrument for the extraction and quantity determination of gas in air, having a very small size and a new shape which considerably increases its convenience of use.

The new instrument belongs to the type of apparatus which can be held, carried and operated in a single closed hand, and comprises an incorporated air-suction means.

Apparatus of this type is already known, in which the incorporated means is a piston actuated against the force of a spring.

Other apparatus are known, in which the incorporated means is a bellows device actuated against the force of a spring.

The portable apparatus according to the invention is composed of a device for the extraction and/or quantity determination of gas in air, enclosed in a casing, and of an outer case, and is essentially characterized in that the said outer case comprises:

A housing in which the above-mentioned casing is placed;

An elastically deformable pocket, adventive from said housing;

Means for putting into communication, by means of clapper-valves if necessary, on the one hand the pocket and the device included in the casing, each with the atmosphere and on the other hand, the device included in the casing with the pocket.

In accordance with a particular feature, the outer case is wholly constituted by an elastically-deformable material.

According to a further characteristic feature, the housing is hermetically closed by the casing when this latter is placed inside it.

According to other characteristic features:

The device included in the casing is put into communication with the atmosphere through the wall of the housing;

The pocket is put into communication with the atmosphere by means of a clapper-valve fixed on the bottom of said pocket;

The device included in the casing is put into communication with the chamber by means of a clapper-valve;

The reading dial of the measuring device is located on the upper part of the apparatus.

In the case of an electric intermittent-measurement device, the contractor which effects the measurement is provided on the part of the device which projects from the top of the housing.

In the case of an electric measurement device supplied from an incorporated re-chargable source, two charging terminals are provided on the exterior of the apparatus.

The charging terminals are two contact studs fixed on the part of the device which projects from the top of the housing.

In accordance with a further characteristic feature, the bottom of the outer case comprises a stabilizing rim.

Other characteristic features and advantages of the present invention will be brought out in the description which follows below, reference being made to the accompanying drawings, in which:

FIGS. 4, 5 and 6 are three sections of the apparatus according to the invention, equipped with the quantity determination device;

FIG. 7 shows the apparatus according to the invention in the user's hand.

Figures 1, 2:
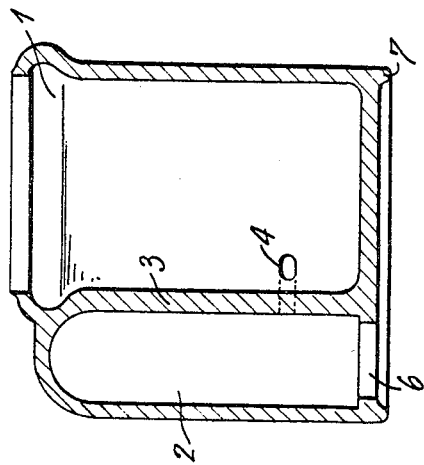
FIGS. 1 and 2 are two diagrammatic sections of the outer case of the apparatus according to the invention.

The outer case of the apparatus, of which one preferred form of construction is shown in FIGS. 1 and 2, is wholly manufactured from an elastically-deformable material, for example of rubber.

According to the invention, this outer case comprises:

A housing 1 in which is placed the extraction or quantity determination device;

A chamber 2, separated from the said housing by a partition 3 pierced with a communication orifice 4.

The outer wall of the housing is pierced with a suction orifice 5, while the bottom of the chamber is provided with an exhaust orifice 6.

The bottom of the said outer case is preferably provided with a rim 7 which gives the apparatus satisfactory stability.

Figure 3:
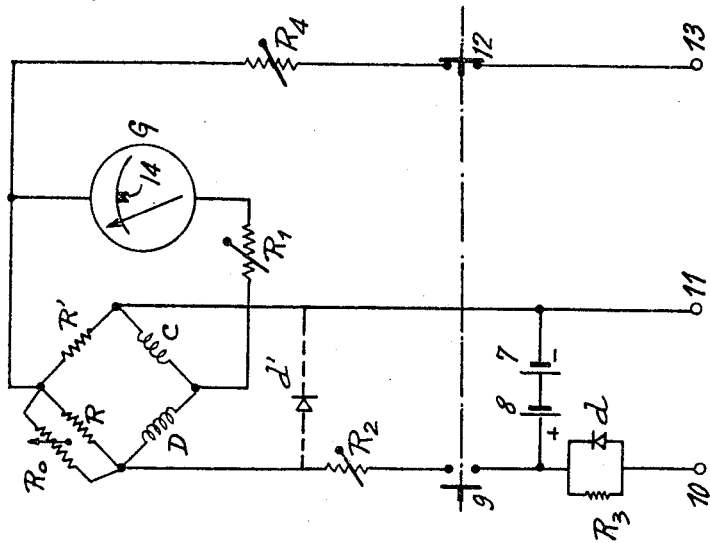
FIG. 3 is the electrical diagram of a device for the quantitative determination of combustible gas in air, utilizing the well-known method of catalytic combustion on the detector filament of a measuring bridge.

FIG. 3 shows the electrical diagram of a quantity-determination device capable of being placed in the housing 1.

The quantity-determination device comprises, in a manner known per se:

A measuring bridge constituted by a detector filament D, a compensating filament C, two fixed resistances R and R'. A variable resistance $R_0$ completes this bridge, the measuring diagonal of which comprises a galvanometer G in series with an adjustable resistance $R_1$, serving to adjust the sensitivity of the galvanometer;

Two re-chargable batteries 7 and 8, connected in series, supplying the said bridge through the intermediary of a contactor 9 and a variable resistance $R_2$ which serves to regulate the voltage applied to the supply diagonal of the bridge.

Two re-charging terminals 10 and 11 permit of direct access to the terminals 7 and 8 of the battery unit, through a diode $d$ shunted by a load-current limiting resistance $R_3$.

The measuring circuit connected to the galvanometer comprises, in series:

An adjustable resistance $R_4$ of high value, enabling the galvanometer to work as a voltmeter;

A switch 12 coupled to the contactor 9 in such manner that one is in the position of rest when the other is in the working position and vice-versa;

A control contact stud 13.

The checking of the voltage at the terminals of the batteries is carried out by short-circuiting the studs 10 and 13, the contactor 9 being in the position of rest. As the checking circuit is re-closed by the whole of the bridge, partly in series and partly in shunt, it follows that for any alteration of one of the arms of the bridge, the galvanometer would give an abnormal indication.

The normal indication, that is to say with a correct circuit and the batteries sufficiently charged, can be marked on the galvanometer dial by a fixed index 14.

FIGS. 4, 5 and 6 show three diagrammatic cross-sections of an apparatus according to the invention, adapted to the electrical diagram described above, FIG. 6 being a section made along a vertical plane passing through the axis of the suction orifice of the sample-extraction device.

The casing of the apparatus, formed by shells 15 and 16, is inserted in the housing 1 of the outer case, and comprises:

A fluid-tight chamber 17 in which is housed at least the detector filament D; this chamber is put into communication with the atmosphere by means of a metal ring 18, forced in the suction orifice 5;

The two re-chargeable batteries 7 and 8;

The galvanometer G, protected by a cover 19 fixed on the casing and ensuring the fluid-tightness of the housing 1; the dial of the galvanometer is mounted on the upper face of the apparatus.

The re-charging terminals are connected to the free terminals of the batteries by means of conductive corner plates 20 and 21.

The chamber 2 is put into communication with the chamber 17 by means of a clapper-valve 22 which permits the passage of the gaseous mixture in the direction: chamber 17–chamber 2 (arrow $f1$).

It is also put into communication with the atmosphere through a clapper-valve 23, fixed on the exhaust orifice 6, and permitting the passage of the gaseous mixture in the direction from the chamber 2 to the atmosphere (arrow $f2$).

The control knob of the contactor 9 is preferably embedded into the body of the cover 19, on the side in which the index finger of the operator's hand is naturally placed. The said knob is fixed to an elastically-deformable plate 24 which also ensures the fluid-tightness of the instrument.

The outer case being held in one hand, as shown in FIG. 7, it is only necessary to press the outer wall of the chamber 2 in order to expel the volume of gas contained in the said chamber.

The pressure of the fingers is then released so as to permit the introduction (arrow $f3$) of a certain volume of gas into the quantity determining chamber. As the volume of the chamber is generally greater than the volume of the chamber 17, a single pressure on the chamber 2 is sufficient to expel all the atmosphere contained in the chamber 17.

It is then only necessary to recommence the operation in order to fill the measuring chamber with a representative sample of the atmosphere to be tested.

In the case where the electrical circuit comprises the checking circuit for the battery voltage, the control terminal 13 can be constituted advantageously by the ring 18 located on the same side as the re-charging terminal 10. The short-circuiting of 10 and 13 is then effected by means of any conductive element of sufficient length.

Although the apparatus can be introduced into any place where the hand which is holding it can pass, it may happen to be necessary to make a sample extraction or a test at a high point which the operator cannot reach. In that case, it is an easy matter to add to the apparatus an extension tube which is connected in a fluid-tight manner to the ring 18 by any known means, for example by screwing or by fixing by means of screws.

The foregoing description has clearly brought out the great convenience of use of the apparatus. Light, small—it can easily be carried in the pocket—it is readily handled with a single hand.

It enables air to be taken for sampling at a very short distance from the walls or from the roof of tunnels.

In addition, the outer case being wholly of flexible material, protects the dosage and measuring device effectively against shocks.

It is clear that the foregoing description has only been given by way of indication and not in any limitative sense and any modification can be made in conformity with the spirit of the invention without departing from its scope.

Thus, the measuring and dosage device may be other than that described above, as for example, a colorimeter device or a device based on a principle other than catalytic combustion on a heated filament.

Modifications may also be made to the electrical circuit described; thus, it is possible to improve the regulation of the voltage applied to the bridge by mean of suitably arranged diodes $d'$ or like devices.

Similarly, the ring 18 may be provided with any known type of filter device 25.

Finally, the separating wall between the housing 1 and the chamber 2 can be limited to simple stops which hold the casing in its housing.

I claim:

1. In a detector employing an electrically heated filament means, power source, and indicating means, for sampling and quantity determination of gas in air of a type which is carried and operated in one hand, sampling means comprising a casing forming an integral unit of a size and shape adapted to be operatively held in one hand and grasped by the fingers of that hand;

a partition within said case separating said case into at least two portions;

one of said portions forming a flexible walled squeeze chamber having a communication channel into said chamber and an exhaust orifice;

the other of said portions containing a fluid tight chamber having an inlet suction orifice and connection with said communication channel, detecting means having filament means within said fluid tight chamber, and indicating means located in the upper part of said other of said portions for readability during and after operation of said squeeze chamber;

and valves in each of said orifices and said channel allowing fluid flow in one direction only through said inlet suction orifice, through said fluid tight chamber, through said communication channel, through said flexible walled squeeze chamber and through said exhaust orifice.

2. The apparatus of claim 1, wherein said valves are of clapper valve type.

3. The apparatus of claim 1, wherein said casing is constructed of flexible, elastic type material.

4. The apparatus of claim 1, wherein an electric intermittent measurement device having a contactor causing the measurement to take place is in said casing with a connection to said contactor through said casing at the upper portion thereof.

5. The apparatus of claim 4 wherein a battery source is connected to said measurement device, having two terminals provided on the exterior of said casing.

References Cited

UNITED STATES PATENTS

| 2,234,499 | 3/1941 | McAllister | 73—23 |
| 2,310,472 | 2/1943 | Sullivan | 73—27 |
| 2,786,350 | 3/1957 | Johnson | 73—27 |
| 3,276,241 | 10/1966 | Hubner | 73—23 |

FOREIGN PATENTS 1,224,831  2/1960  France.

RICHARD C. QUEISSER, Primary Examiner.

JOHN K. LUNSFORD, Assistant Examiner.

U.S. Cl. X.R.

73—27